United States Patent [19]

Laue

[11] Patent Number: 4,521,948
[45] Date of Patent: Jun. 11, 1985

[54] METHOD FOR FABRICATING A VALVE

[75] Inventor: Charles E. Laue, Wilmette, Ill.

[73] Assignee: Hamilton-Pax, Inc., Chicago, Ill.

[21] Appl. No.: 463,536

[22] Filed: Feb. 3, 1983

[51] Int. Cl.³ .......................... B21K 1/20; B23P 13/00
[52] U.S. Cl. ............................ 29/157.1 R; 29/157 R;
   29/DIG. 4; 137/15; 137/315; 137/318
[58] Field of Search ........ 29/157 R, 157.1 R, DIG. 4;
   137/15, 315, 318, 625.27

[56] References Cited

U.S. PATENT DOCUMENTS

| | | | |
|---|---|---|---|
| 1,825,042 | 9/1931 | Baldwin, Jr. | 29/157 R |
| 1,860,605 | 5/1932 | Baldwin, Jr. | 29/157 R |
| 1,956,554 | 5/1934 | Baldwin, Jr. | 29/157.1 R |
| 1,972,821 | 9/1934 | Weatherhead, Jr. | 29/157.1 R |
| 2,209,709 | 7/1940 | Weatherhead, Jr. | 29/DIG. 4 |
| 2,309,666 | 2/1943 | Parker | 29/157.1 R |
| 2,536,727 | 1/1951 | Crawley | 29/157.1 R |
| 2,669,011 | 2/1954 | Brumbaugh | 29/157.1 R |
| 2,674,786 | 4/1954 | Crawley | 29/157 R |
| 3,417,450 | 12/1968 | Zell | 29/157.1 R |

Primary Examiner—Charlie T. Moon
Assistant Examiner—Ronald S. Wallace
Attorney, Agent, or Firm—Walter L. Schlegel, Jr.

[57] ABSTRACT

A segment is cut off a rotating hexagonal bar by opposed cutting tools which form a raised seat for a sealing gasket. The segment defines a hexagonal valve body into which coaxial larger-diameter and smaller-diameter holes are drilled from oppositely facing walls of the six walls of the body, respectively, and a round distribution chamber or port is drilled through the seat centrally thereof and into one side of the body. An internally threaded sleeve is tightly fitted into the smaller-diameter hole and extends toward the chamber to define a back seat. A charging port is drilled through the opposite side of the body and into the sleeve inwardly of its threads. A valve stem with a head at one end having a smaller diameter than the larger-diameter hole is inserted therethrough and is threaded into said sleeve until the head is in the chamber and the opposite end of the stem projects externally of the sleeve for actuation of the head. Another sleeve is tightly fitted into the larger-diameter hole and extends inwardly to define a front seat. The head is alternately engageable with respective front and back seats. A charging nipple is tightly fitted into the charging port. The sleeves and the nipple are brazed into the holes and charging port, respectively. A pair of spaced mounting holes parallel to the charging port and spaced from the chamber are drilled through the body, each one at an apex of a pair of body walls not intersected by said holes. Although a hexagonal body has been found to be the preferred form and the most efficient use of material for the body, other less efficient forms may be used.

3 Claims, 3 Drawing Figures

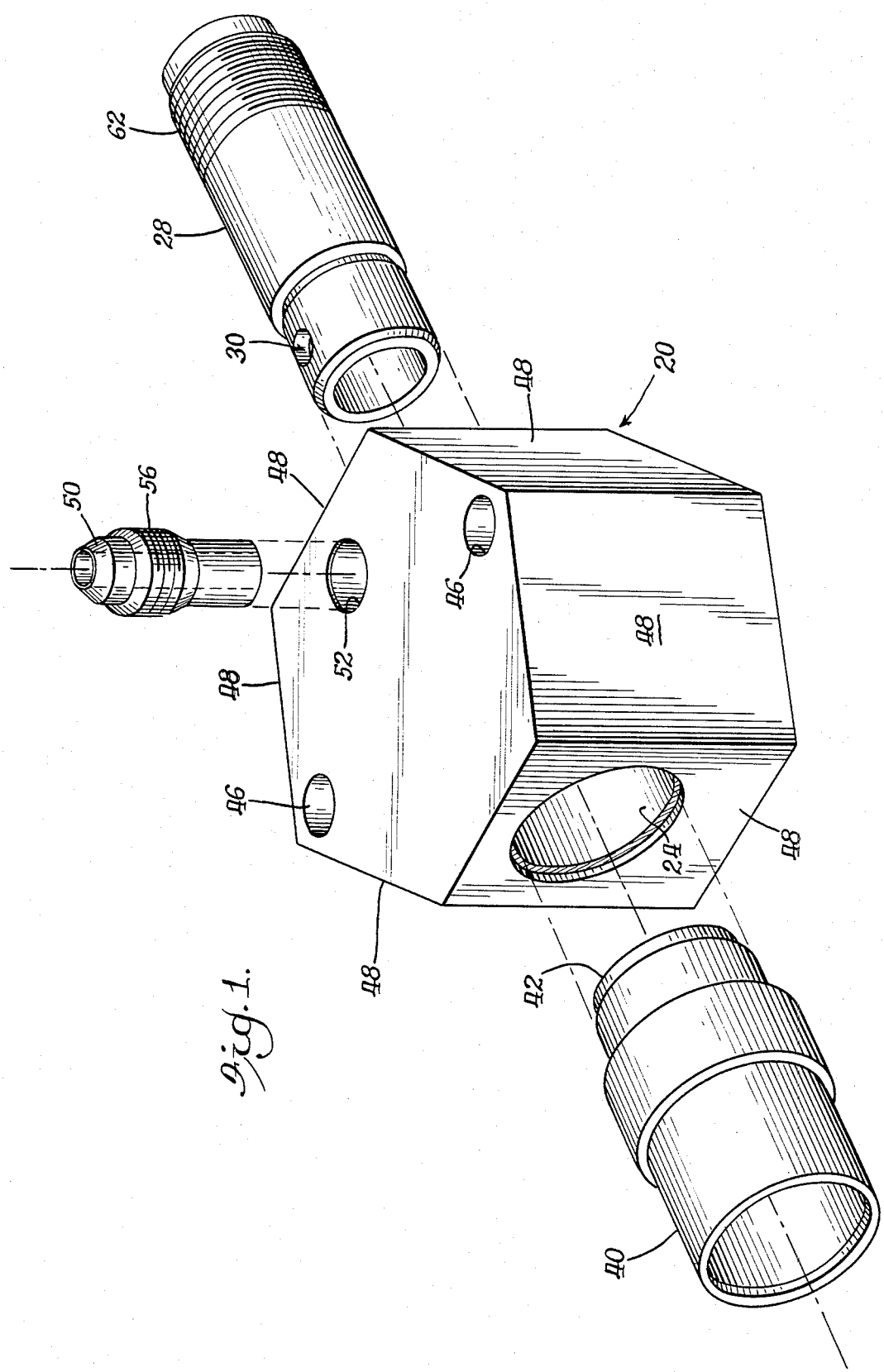

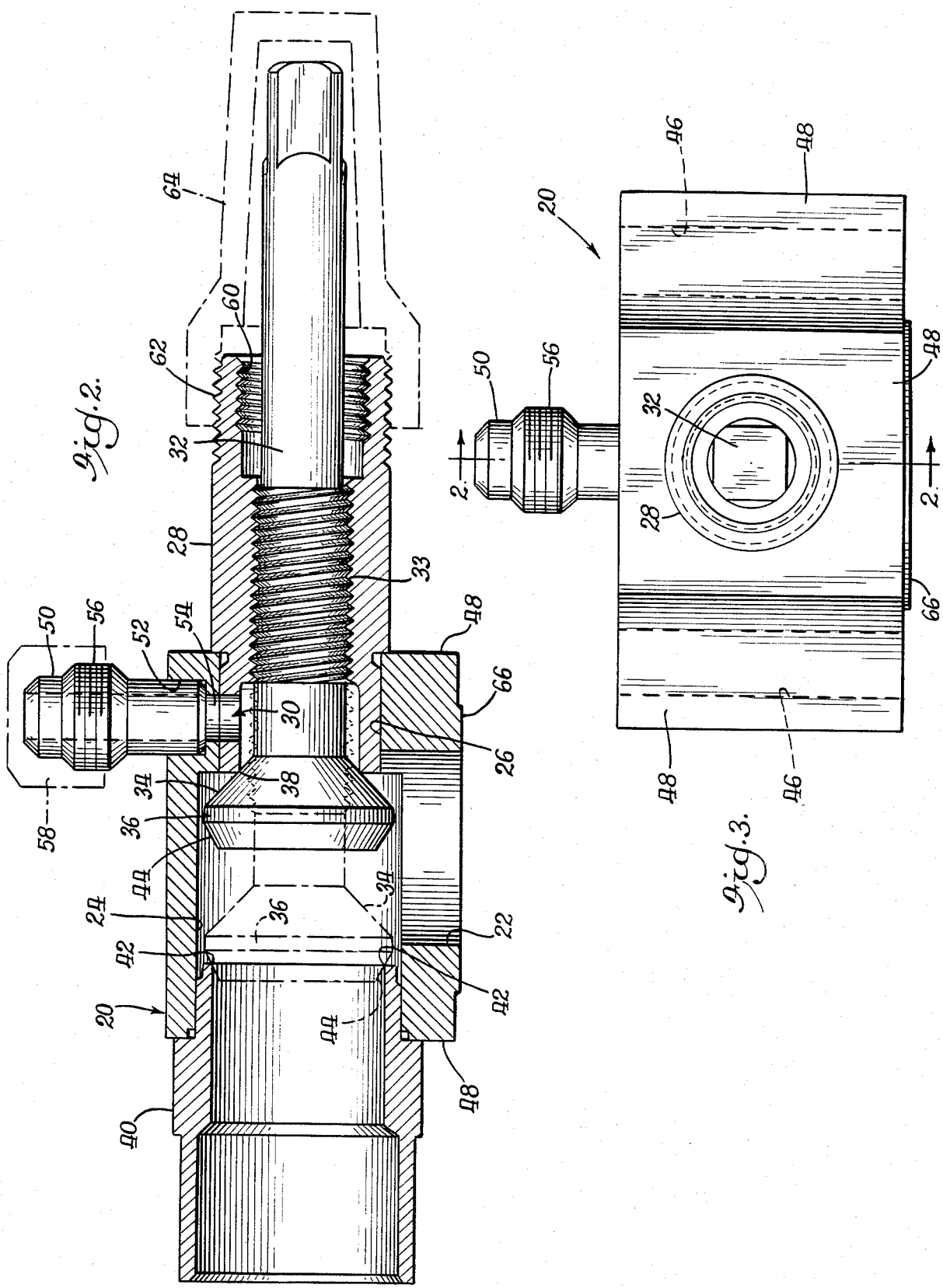

METHOD FOR FABRICATING A VALVE

This invention relates to valves such as are commonly used in refrigeration systems and more particularly to such a valve which is economical to manufacture and composed of precision-produced parts which ensure dependability in performance and long life in service.

A primary object of the invention is to devise such a valve which is fabricated from components which are produced precisely and economically in large volume by automatic screw machines and automatic assembly equipment.

Another object of the invention is to ensure dependability in performance by providing threaded valve components in which the threads and other parts are produced and assembled to close tolerances.

Still another object of the invention is to ensure dependability in performance and long life in service by manufacturing valve components from low carbon, mild steel and brazing the parts together after precision assembly thereof by automatic equipment.

The foregoing and other objects and advantages of the invention will become apparent from the following specification and the accompanying drawings, wherein:

FIG. 1 is an exploded isometric view of the valve body components of a novel valve embodying the invention in a preferred form;

FIG. 2 is a sectional view on line 2—2 of FIG. 3 with the valve stem shown in elevation at back-seated position by solid lines and at front-seated position by phantom lines; and FIG. 3 is an end view taken from the right of FIG. 2.

Describing the invention in detail the novel valve comprises a steel body 20 which is hexagonal in its preferred form as shown in FIG. 1. A round distribution chamber or port 22 (FIG. 2) is drilled into one side of the body which is ordinarily its bottom as shown in the drawings. The chamber 22 does not extend to the opposite side of the body which as shown is its top side.

A larger-diameter hole 24 and a smaller-diameter hole 26 are drilled through opposed walls 48 of the hexagonal body to communicate with the chamber 22. An internally threaded steel sleeve 28 is tightly fitted into the hole 26 so that a charging port 30 may be drilled through the top side of the body and through the wall of the sleeve 28 inwardly of its threads.

A threaded valve stem 32 is inserted through the larger-diameter hole 24 and is threaded at 33 into the sleeve 28 to the position shown at solid lines in FIG. 2 whereat a parti-conical seat 34 on a head 36 of the stem 32 is seated against the sleeve 28 at its inner end which thus defines what is called a back seat 38. When the back seat is closed as shown at solid lines in FIG. 2 flow of fluid between the chamber 22 and the charging port 30 is cut off.

After assembly of the stem 32, a larger-diameter steel sleeve 40 is tightly fitted into the hole 24 to the position of FIG. 2 and affords a front seat 42 for another parti-conical seat 44 on the head 36 as shown by phantom lines in FIG. 2. Thus the head may be alternately actuated to the back-seated position shown in solid lines in FIG. 2 whereat the front set is open and to the front-seated position shown in phatom lines in FIG. 2 whereat the back seat is open. The stem may also be actuated to an intermediate position (not shown) whereat fluid flow between both seats and the chamber 22 is accommodated.

The body also has drilled mounting holes 46, each located at the apex of a pair of body walls 48 neither of which is intersected by the hole 24 or the hole 26.

A steel charging nipple 50 is fitted into the charging port 30 at a larger-diameter portion 52 thereof and seats against the body around a smaller-diameter portion 54 of the charging port 30 as shown in FIG. 2 so that there is no possibility, during assembly of the nipple, of interference with the stem 32. The nipple is threaded at 56 for a coupling (not shown) by which a refrigerant such as freon gas may be charged into the system past the front seat normally connected to the compressor by a line (not shown) welded into the outer end of the sleeve 40 and through the distribution chamber 22 into a distribution manifold (not shown) to which the body 20 is connected by bolts or screws extending through the mounting holes 46. When the nipple is not in use for that purpose a cap 58 is threaded onto the threads 56. The sleeve 28 is internally threaded at 60 for a conventional packing gland (not shown) and is externally threaded at 62 for a cap 64.

In manufacture of the novel valve, the stem 32 and the sleeves 28 and 40 and the nipple 50 are machined from low carbon, mild steel stock produced as standard items by a steel mill. The stock is machined and threaded by precision automatic screw machines to close tolerance to produce these parts as shown in the drawing.

A segment is cut off a rotating hexagonal bar by opposed cutting tools moving toward the rotational axis until the body segment 20 is cut off with a raised gasket seat 66 on the bottom of the body segment 20.

The chamber 22 is then drilled centrally of the seat 66 by an automatic screw machine. The holes 24 and 26 are then drilled irrespective of sequence. The sleeve 28 is then press-fitted to the position shown in the drawings. The charging port 30 is then drilled as shown through the body 20 and the wall of sleeve 28 before the valve stem 32 is assembled through the hole 24 and is threaded to the position shown at solid lines in FIG. 2 or to an intermediate position (not shown) whereat the sleeve 40 may be press-fitted to the position shown spaced from the seat 44.

The nipple 50 may be press-fitted to the position shown at any time after the charging port 30 is drilled, and the mounting holes 46 are preferably the last to be drilled, either before or after assembly of the nipple 50.

All of the drilling and press-fitting are performed by high precision automatic machinery which works to close tolerances to produce a valve which is dependable in performance and capable of long life in service.

The sleeves 28 and 40 and nipple 50 are then simultaneously brazed to the body to maintain those tolerances for the life of the valve. This is done before the packing gland (not shown) is assembled and the two caps 58 and 64 are assembled prior to shipment to the user.

According to the most pertinent prior art known to Applicant a body is formed as a one-piece brass forging, with the back seat and threads for the stem formed directly in the brass, as well as the charging port which is also internally threaded directly in the brass. After assembly of a stem, the body is closed by a forged brass segment soldered to the body and having a front seat.

It is noted that according to Applicant's invention the use of a hexagonal bar to form the body has been found to be the most efficient use of stock material for the body although other less efficient forms may be used without departing from the spirit of other aspects of the invention, provided that the mounting holes 46 must be spaced from chamber 22 and from holes 24 and 26.

What is claimed is:

1. A method of making a valve comprising the steps of forming a body wiith six walls by cutting from a substantially hexagonal steel bar a segment which is thinner than the minimum width of the hexagonal cross-section of the body, drilling a round chamber in one side of the body spaced from its opposite side and from said walls, drilling two substantially coaxial holes into said chamber from two oppositely facing of said walls, respectively, one of said holes being of larger diameter than the other, fitting an internally threaded steel sleeve into the smaller-diameter of said holes, with its inner end defining a back seat, drilling a charging port into said other side of said body with a smaller-diameter portion of said port extending through said body and through said sleeve at a point spaced outwardly from said chamber and inwardly of the sleeve's threads, inserting a valve stem through the larger-diameter of said holes and threading it into said sleeve until a head on one end of said stem is within said chamber with the other end of the stem projecting beyond said sleeve for actuation of the head, fitting a steel charging nipple into said port until it seats against the body around said smaller-diameter portion of said port at an area spaced from said sleeve, fitting another steel sleeve into the larger-diameter of said holes to define a front seat at the inner end of said other sleeve, said head being alternately engageable with the inner ends of respective sleeves to alternately engage one seat, while disengaging the other said head when disengaged from the back seat opening the charging port to said chamber, and then brazing said sleeves and nipple simultaneously to said body around said holes and said port, respectively.

2. A method according to claim 1 comprising drilling a pair of spaced mounting apertures through the body substantially parallel to the charging port and spaced from the chamber, each at an apex of a pair of the six body walls not intersected by said holes.

3. A method of making a valve comprising the steps of forming a body with two oppositely facing walls by cutting a segment from a steel bar, drilling a round chamber in one side of the body spaced from its opposite side and from said walls, drilling two substantially coaxial holes into said chamber with one of said two holes being drilled in each of said two oppositely facing walls, one of said holes being of larger diameter than the other, fitting an internally threaded steel sleeve into the smaller-diameter of said holes, with the inner end of the sleeve defining a back seat, drilling a charging port through said other side of body with a smaller-diameter portion of said port extending through said body and through said sleeve at a point spaced outwardly from said chamber and inwardly of the sleeve's threads, fitting a steel charging nipple into said port spaced from said sleeve and seated at one end of said nipple against said body around said smaller-diameter portion of said port, inserting a valve stem through the larger-diameter of said holes and threading it into said sleeve until a head on one end of said stem is within said chamber with the other end of the stem projecting beyond said sleeve for actuation of the head, fitting a second steel sleeve into the larger-diameter of said holes and defining a front seat at the end of said second sleeve, which faces said head, said head being alternately abuttable with the respective sleeves to alternately engage one seat while disengaging the other, said head when disengaged from the back seat opening the charging port to said chamber, and then brazing said sleeves and nipple to said body simultaneously around said holes and said port, respectively.

* * * * *